Sept. 6, 1966 R. O. WILEY 3,271,550

SWITCH DEVICE WITH UNITARY SUPPORT, PIVOT AND ACTUATING STRUCTURE

Filed June 25, 1964

2 Sheets-Sheet 1

WITNESSES:

John G. Chopp

Edward F. Possessky

INVENTOR

Roy O. Wiley

BY F. V. Lyle

ATTORNEY

Sept. 6, 1966

R. O. WILEY 3,271,550

SWITCH DEVICE WITH UNITARY SUPPORT, PIVOT AND ACTUATING STRUCTURE

Filed June 25, 1964

2 Sheets-Sheet 2

United States Patent Office 3,271,550

Patented Sept. 6, 1966

3,271,550
SWITCH DEVICE WITH UNITARY SUPPORT, PIVOT AND ACTUATING STRUCTURE

Roy O. Wiley, Huntington, Conn., assignor to Westinghouse Electric Corporation, East Pittsburgh, Pa., a corporation of Pennsylvania Filed June 25, 1964, Ser. No. 377,986
7 Claims. (Cl. 200—172)

The present invention relates to wiring devices and more particularly to quiet operating switches.

It is desirable primarily for user convenience and satisfaction, and thus for marketability, that electric switches operate with a low noise level. The mercury switch, in which a button containing mercury is employed for circuit making and breaking purposes, is a well known example of a "quiet operating" switch device. In addition, there also are some switches having mechanical circuit making and breaking means arranged to provide for relatively quiet switch operation. An example of the latter type switch is shown and described in U.S. Patent 3,082,309, entitled Wiring Device for Controlling Circuit Continuity, filed by V. L. Carissimi on August 21, 1959, and assigned to the present assignee.

In both mercury and "mechanical" switches, the character of the lever actuator operation is desirably provided to minimize overall switch noise to the extent that actuator noise contributes to the overall noise level. Thus, an overcenter arrangement for the actuator is either eliminated if feasible, as is normally true in the case of mercury switches, or it is so characterized as to produce little operating noise in mechanical or other switches as in the case of the switch shown in the referenced Carissimi patent. In addition, actuator movement is desirably characterized with minimal noise producing physical contact with supporting or other surrounding parts of the switch.

In U.S. Patent 3,054,878, entitled Wiring Device for Controlling Circuits, filed by R. O. Wiley on July 18, 1960, and assigned to the present assignee, there is disclosed a switch in which the "physical contact" noise of a lever actuator is held low by means of a smooth flexible plastic strap which supports the actuator inwardly of the switch housing against the circuit making and breaking means or mercury button. Although the structure in the referenced Wiley patent thus provides a favorably low level of physical contact noise from the actuator, it does so only where the circuit making and breaking means has a suitable structural character for supporting the actuator against the inward supporting force produced by the plastic strap. The mercury switch is particularly suitable in this respect, but in cases where the circuit making and breaking means are unsuitable for the indicated support function, such as in the referenced Carissimi switch, the actuator still must be conventionally supported by means of side projecting trunnions which are seated in pivot support pockets normally located in the switch housing. With this support arrangement, physical contact noise and particularly pivot "backlash" noise of the actuator is objectionable. There is therefore open to realization a switch actuator and switch supporting structure therefor which cooperate to produce a favorably low level of actuator physical contact noise in a range of applications wider than that of the referenced Wiley disclosure or at least in a range of applications not met by that of the referenced Wiley disclosure.

In accordance with the broad principles of the present invention, there is provided a quiet switch device in which an actuator is integrally connected through flexible or hinge portions to a support or frame portion. The support portion of the integral actuator unit is fixed in relation to a housing of the switch device, and the actuator is suitably structured to operate circuit making and breaking means as it is pivoted in its supported position about the hinge portions of the integrated actuator unit. Relative quietness in operation is achieved through a favorably low level of physical contact actuator noise and particularly through substantial elimination of conventional pivot backlash noise.

Thus, it is an object of the invention to provide a novel switch which is characterized with quiet and smooth operation.

An additional object of the invention is to provide a novel switch in which actuator pivot "backlash" noise is substantially eliminated.

Another object of the invention is to provide a novel switch in which physical contact noise of the lever actuator is held to a favorably low level.

These and other objects will become more apparent upon consideration of the following detailed description of specific embodiments of the invention along with the accompanying drawings, in which.

Figure 1:
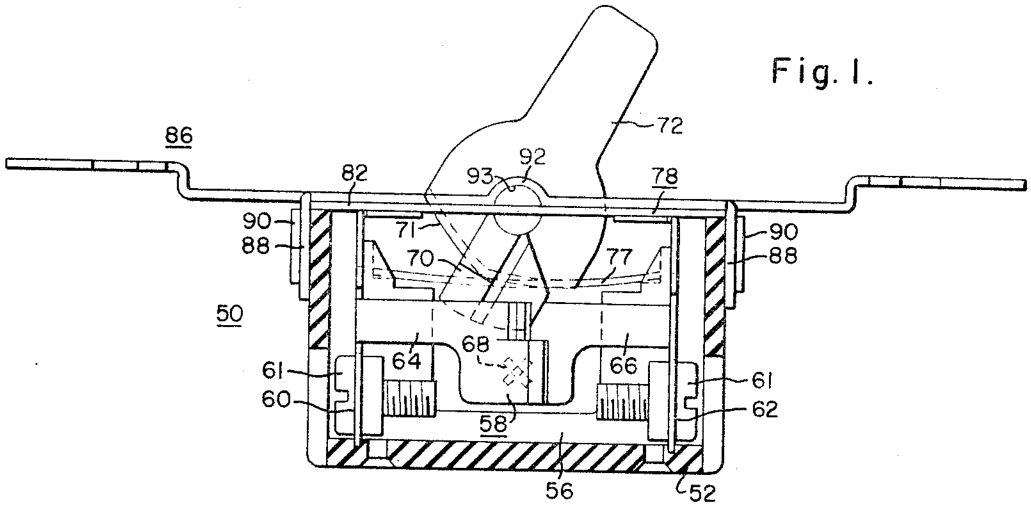
FIGURE 1 shows a longitudinal section of a switch constructed in accordance with the principles of the invention.
Figure 2:
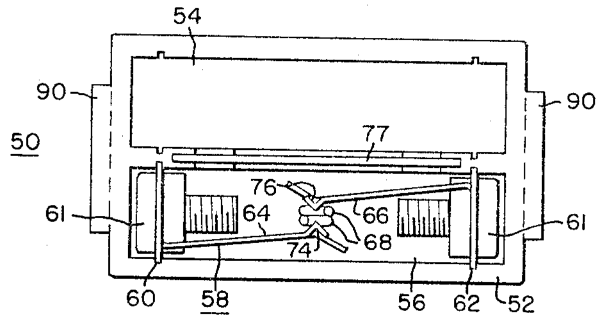
FIG. 2 shows a top plan view of a housing and internal operating elements of the switch shown in FIG. 1.
Figure 3:
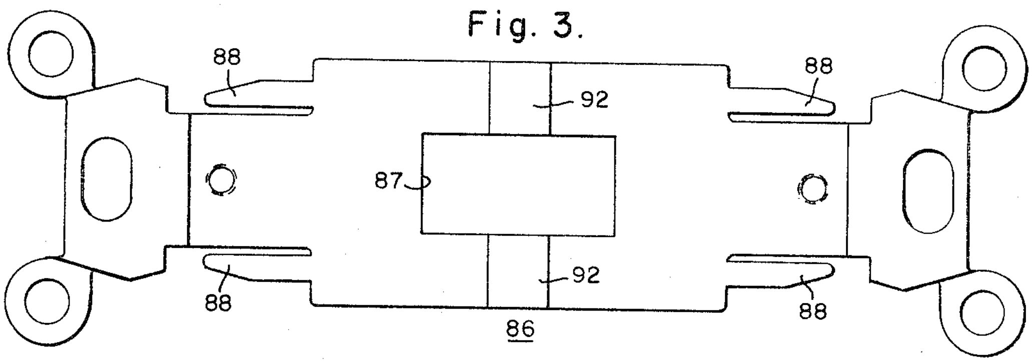
FIG. 3 shows a top plan view of a yoke used in the switch of FIG. 1.

With reference to FIGS. 1 and 2, there is shown an embodiment of the invention in the form of a switch 50 which is generally similar to the switch disclosed and fully described in the referenced Carissimi patent. The switch 50 is the type ("mechanical") of switch in which it is preferred to embody the invention since it is this class of switch in which "backlash" noise is usually encountered.

The switch 50, which will be described here only to the extent necessary for an undertanding of the manner in which the invention is embodied in it, includes an insulative housing 52 having an open top side and provided with respective pockets 54 and 56 for placement of respective "mechanical" circuit making and breaking means 58 of which only one is shown in the pocket 56. The circuit making and breaking means 58 include separate terminals 60 and 62 having suitable wire connection means 61 and being suitably supported in the housing pocket 56, and each of the terminals 60 or 62 includes an elongated contact arm 64 or 66 normally resiliently urged toward each other. Silver contact buttons or silver wire segments 68 provide the actual circuit contact.

Separation of the wire contact segments 68 is achieved by actuating portion 70 of actuator handle 72 passing between respective portions 74 and 76 of the contact arms 64 and 66 when the handle 72 is pivoted. Overcenter means or overcenter wire 77 cooperate with handle portion 71 in providing overcenter action. If circuit making and breaking means 58 are also provided in the housing pocket 54, the handle 72 can be provided with an additional actuating portion similar to the actuating portion 70 for the purpose of controlling the added circuit making and breaking means.

Figure 4:
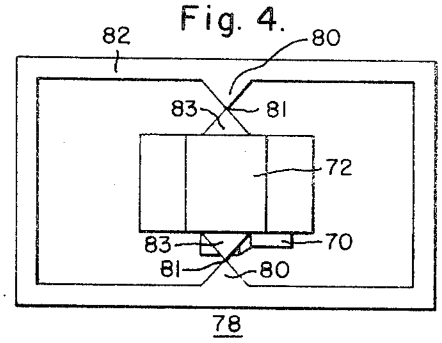
FIGS. 4 and 5 are top plan and elevational views of an integral switch handle and support which forms a part of the switch of FIG. 1.
Figure 5:
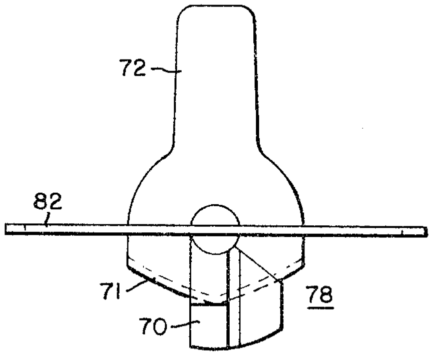

In FIGS. 4 and 5, there is shown an actuator unit 78 which includes the actuator handle 72 in accordance with the principles of the invention. The actuator unit 78 integrally includes the handle 72 which is supported through pivot means including hinge portions 80 on frame support member 82. The actuator unit 78 is preferably made of a resilient material such as a thermoplastic which, in thin sections, will flex readily. One such material is polypropylene which exhibits excellent life in flexing.

In this instance, handle pivot arms 83 which project laterally outwardly from the elongated handle 72 are gradually reduced with conical shape so as respectively to form a thin flexible pivot section 81 with each of the hinge portions 80. Thus, in this case, the pivot arms 83 deform torsionally about the thin pivot section 81 when the handle 72 is pivoted. To provide added stability, the frame support portion 82 has a box-like shape and it extends completely around the handle 72 with the hinge portions 80 located on opposite inner sides of the frame support portion 82 and substantially at the midpoint of its longitudinal dimension. However, in other embodiments, the frame support portion 82 can have other shapes so long as it is susceptible to being fixedly located for proper handle pivot support.

The actuator unit 78 is secured or clamped in place relative to the housing 52 by suitable means. Preferably, it is disposed on the open housing side so that the frame support portion 82 is supported on top housing wall surface about the periphery of the housing 52. Yoke 86 is then disposed over the actuator unit 78 so that the handle 72 projects through a yoke opening 87. The yoke 86 is secured to the housing 52 by suitable means such as by fastening arms 88 which engage about and under housing projection 90 at each end of the housing 52. When thus assembled, the yoke 86 fixedly locates the frame support portion 82 of the integral actuator unit 78, and arcuate yoke portions 92 form respective pockets 93 within which the handle arms 83 torsionally pivot relative to the integral hinge portions 80. Preferably, the inner surface of each yoke portion 82 is smooth to provide for substantially free and quiet pivotal movement of the arms 83 when the handle 72 is pivoted. Since the pivot points or hinge portions 80 are relatively fixed in place by reason of the fixed location of the frame support portion 82, "backlash" and associated noise, typically associated with trunnion supported actuator handles as a result of the sliding impact of the handle pivot trunnions against the walls of their retaining slots as the handle is pivoted, are virtually eliminated. The switch 50 thus operates quietly and smoothly.

Figure 6:
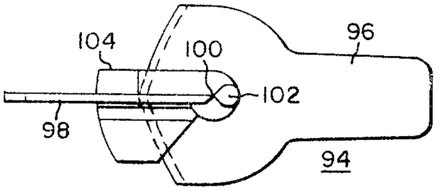
FIGS. 6 and 7 are elevational and top plan views of another integral switch actuator unit or handle and support which can be employed in the switch of FIG. 1.
Figure 7:
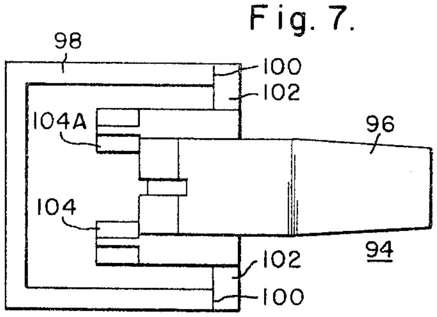
Figure 8:
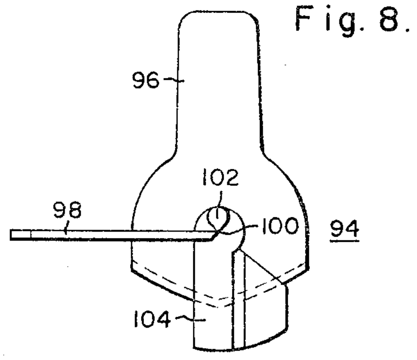
FIG. 8 is an elevational view of the handle in a position it would take in actual use.

FIGS. 6, 7 and 8 show another actuator unit 94 including an elongated switch handle 96 and an integral support portion or frame 98 interconnected by integral pivot means or flexible portions or preferably thin section hinge portions 100 about which the handle 96 and its laterally outward projected arm portions 102 respectively are pivoted. As in the unit 78, the combined one piece handle, hinge and frame arrangement 94 is made of a resilient material such as a thermoplastic which, in thin sections, will flex readily.

The frame support portion 98 is secured or clamped in place (not shown) by suitable means, preferably as in the previous case, that is between the underside of the yoke 86 and the top wall surface of housing 52. With the frame portion 98 thus located, a handle actuating portion 104 is disposed (as indicated in FIG. 8) for operating (not shown) the switch contact arms 64 and 66. There is also shown in this case another actuating portion **104*a*, identical with the portion 104**, for the purpose of operating a second set of switch contact arms.

Further, each of the hinge portions 100 and the adjacent portion of the associated handle pivot arm 102 are disposed (not shown) in the pockets 93 bounded on top by the yoke arcuate portions 92. The pivot support points or hinge sections 100 are then relatively fixed in place by reason of the fixed placement of the frame 98 and operating noise is favorably low since the noise associated with conventional "backlash" is substantially eliminated.

The integral actuator units 78 and 94 or obvious modifications thereof can be employed in other switch devices for the purpose of achieving the quietness in operation described for the switch 50. In any case, pivotal movement of the handle is characterized with smoothness of operation and conventional backlash noise is substantially eliminated since the pivot support of the actuator unit handle is substantially fixed in place and thus is not free to shift as the handle is pivoted.

The foregoing disclosure has been set forth only to illustrate the general principles of the invention. Accordingly, it is intended that the invention be not limited by the illustrative embodiments, but, rather, that it be limited only by the scope and spirit of its broad principles.

What is claimed is:

1. A switch device comprising an insulative housing in which circuit making and breaking means are disposed for operation, and an integral actuator unit formed from a single piece of flexible material and having a lever actuator with an actuating portion thereof disposed for operating said circuit making and breaking means, said actuator unit further having a support portion, pivot means integrally interconnecting said support portion with said lever actuator, and means securing said support portion to said housing so as substantially to fix the pivot support points of said lever actuator and thereby substantially eliminate pivot backlash noise.

2. A switch device as set forth in claim 1 wherein said actuator unit support portion is disposed on a portion of said housing and said securing means comprising a mounting yoke secured to said housing and over said actuator unit support portion.

3. A switch device comprising an insulative housing in which circuit making and breaking means are disposed for operation, and an integral actuator unit formed from flexible material and having a lever actuator with an actuating portion thereof disposed for operating said circuit making and breaking means, said actuator unit further having a support portion, oppositely disposed thin hinge sections integrally interconnecting said support portion with respective pivot arms of said lever actuator, and means securing said support portion to said housing so as substantially to fix the pivot support points of said lever actuator and thereby substantially eliminate pivot backlash noise.

4. A switch device comprising an insulative housing in which circuit making and breaking means are disposed for operation, and an integral actuator unit formed from flexible material and having a lever actuator with an actuating portion thereof disposed for operating said circuit making and breaking means, said actuator unit further having a generally U-shaped frame support portion, respective aligned thin hinge sections located at the ends of the legs of said U-shaped support portion and integrally interconnecting said frame support portion with respective pivot arms of said lever actuator so that said lever actuator can pivot about a reference axis through the thin hinge sections, and means securing said support portion to said housing so as substantially to fix the pivot support points of said lever actuator and thereby substantially eliminate pivot backlash noise.

5. A switch device as set forth in claim 4 wherein said U-shaped frame support portion is disposed against a portion of said housing and said securing means comprising a mounting yoke secured over said frame support portion.

6. A switch device comprising an insulative housing in which circuit making and breaking means are disposed for operation, and an integral actuator unit formed from flexible material and having a lever actuator with an actuating portion thereof disposed for operating said circuit making and breaking means, said actuator unit further having a box-shaped frame support portion, oppositely disposed hinge portions and respective thin hinge sections integrally interconnecting said frame support portion with respective pivot arms of said lever actuator so that said lever actuator can be pivoted torsionally relative to said hinge portions, and means securing said support portion to said housing so as substantially to fix the pivot support points of said lever actuator and thereby substantially eliminate pivot backlash noise.

7. A switch device as set forth in claim 6 wherein said frame support portion is disposed on a portion of said housing and said securing means comprising a mounting yoke secured over said frame support portion.

References Cited by the Examiner

UNITED STATES PATENTS

| | | | |
|---|---|---|---|
| 3,082,309 | 3/1963 | Carissimi | 200—153 |
| 3,146,330 | 8/1964 | Miller | 200—172 |

ROBERT K. SCHAEFER, *Primary Examiner.*

ROBERT S. MACON, *Examiner.*

H. O. JONES, *Assistant Examiner.*